(12) United States Patent
Grabher et al.

(10) Patent No.: US 10,753,381 B2
(45) Date of Patent: Aug. 25, 2020

(54) DEVICE FOR CONNECTING TWO FURNITURE PARTS

(71) Applicant: GRASS GMBH, Hoechst (AT)

(72) Inventors: Guenter Grabher, Fussach (AT); Zeljko Kovacic, Bregenz (AT)

(73) Assignee: Grass GmbH, Hoechst (AT)

( * ) Notice: Subject to any disclaimer, the term of this patent is extended or adjusted under 35 U.S.C. 154(b) by 898 days.

(21) Appl. No.: 15/210,063

(22) Filed: Jul. 14, 2016

(65) Prior Publication Data

US 2017/0023042 A1 Jan. 26, 2017

(30) Foreign Application Priority Data

Jul. 23, 2015 (DE) .................... 20 2015 103 874 U

(51) Int. Cl.
*F16B 12/00* (2006.01)
*F16B 12/20* (2006.01)
(Continued)

(52) U.S. Cl.
CPC ...... *F16B 12/2009* (2013.01); *F16B 12/2036* (2013.01); *F16B 12/46* (2013.01); *F16B 12/50* (2013.01); *F16B 2012/2018* (2013.01)

(58) Field of Classification Search
CPC .. F16B 12/2009; F16B 12/2036; F16B 12/46; F16B 12/50; F16B 2012/2018;
(Continued)

(56) References Cited

U.S. PATENT DOCUMENTS 3,456,969 A * 7/1969 Wittenmayer ...... F16B 12/2009
403/231
4,060,949 A * 12/1977 Busse ..................... F16B 12/24
403/231

(Continued)

FOREIGN PATENT DOCUMENTS

DE 71 42 379 U 2/1972
DE 27 48 272 A1 5/1979

(Continued)

OTHER PUBLICATIONS

Extended European Search Report (Application No. 16173164.1) dated Dec. 14, 2016.

(Continued)

*Primary Examiner* — Matthew R Mcmahon
(74) *Attorney, Agent, or Firm* — Burr & Brown, PLLC

(57) ABSTRACT

A device for connecting two furniture parts, wherein the device comprises a housing arrangeable on a first furniture part and an eccentric element rotatably mounted in the housing. The housing is on one wall side flattened, and the flattened wall side of the housing has a continuous opening. The eccentric element is configured to cooperate with a connecting element, wherein the connecting element is arrangeable on a second furniture part, and wherein the connecting element can be coupled with the housing and the eccentric element such that the first and the second furniture part are fixedly connected to each other. The device is characterized in that the continuous opening in the housing on the flattened wall side is fully enclosed at the margin by wall portions.

16 Claims, 16 Drawing Sheets

(51) Int. Cl.
*F16B 12/46* (2006.01)
*F16B 12/50* (2006.01)

(58) Field of Classification Search
CPC ....... F16B 2012/2072; F16B 2012/209; Y10T
403/4602; Y10T 403/4608; Y10T
403/4662; Y10T 403/7009
USPC ............ 403/231, 252, 350, DIG. 8, DIG. 12,
403/DIG. 13; 312/348.1, 348.2, 348.4
See application file for complete search history.

(56) References Cited

U.S. PATENT DOCUMENTS

| | | | | |
|---|---|---|---|---|
| 4,127,353 | A * | 11/1978 | Busse | F16B 12/2054 |
| | | | | 312/264 |
| 4,131,376 | A * | 12/1978 | Busse | F16B 12/2036 |
| | | | | 312/263 |
| 4,236,848 | A * | 12/1980 | Rock | F16B 12/2063 |
| | | | | 403/231 |
| 4,353,663 | A * | 10/1982 | Glickman | F16B 12/20 |
| | | | | 403/230 |
| 4,564,306 | A * | 1/1986 | Rock | F16B 12/2036 |
| | | | | 403/14 |
| 4,984,926 | A * | 1/1991 | Harley | F16B 12/2063 |
| | | | | 403/231 |
| 6,257,796 | B1 * | 7/2001 | Salice | F16B 12/2009 |
| | | | | 403/231 |
| 6,547,477 | B1 * | 4/2003 | Huber | F16B 12/2009 |
| | | | | 403/231 |
| 6,939,075 | B2 | 9/2005 | Walz | |
| 7,682,100 | B2 | 3/2010 | Duval | |
| 8,562,239 | B1 * | 10/2013 | Liu | F16B 12/20 |
| | | | | 403/252 |
| 9,554,645 | B2 * | 1/2017 | Urheim | A47B 47/042 |
| 10,161,432 | B2 * | 12/2018 | Nitschmann | F16B 12/20 |
| 2003/0129021 | A1 * | 7/2003 | Hasler | F16B 12/2036 |
| | | | | 403/300 |
| 2005/0175405 | A1 | 8/2005 | Walz et al. | |
| 2009/0206613 | A1 * | 8/2009 | Hawang | E05B 65/006 |
| | | | | 292/57 |
| 2010/0202852 | A1 * | 8/2010 | Krause | F16B 12/2027 |
| | | | | 411/272 |
| 2014/0356093 | A1 | 12/2014 | Nitschmann | |
| 2015/0147115 | A1 * | 5/2015 | Yang | F16B 12/20 |
| | | | | 403/349 |

FOREIGN PATENT DOCUMENTS

| | | | | |
|---|---|---|---|---|
| DE | 200 04 067 U1 | 6/2000 | | |
| DE | 202 19 178 U1 | 3/2003 | | |
| DE | 203 02 694 U1 | 7/2003 | | |
| DE | 20 2004 000 199 U1 | 4/2004 | | |
| DE | 20 2004 000 473 U1 | 5/2004 | | |
| DE | 20 2013 102 366 U1 | 6/2013 | | |
| DE | 10 2013 103 295 A1 | 10/2014 | | |
| EP | 0990804 A1 * | 4/2000 | ......... | F16B 12/2063 |
| FR | 2445461 A3 * | 7/1980 | .......... | F16B 12/2027 |
| GB | 1 368 905 A | 10/1974 | | |
| GB | 2 040 385 A | 8/1980 | | |
| WO | 2006/047402 A2 | 5/2006 | | |

OTHER PUBLICATIONS

German Search Report (Application No. 20 2015 103 874.7) dated Jan. 5, 2016.

* cited by examiner

DEVICE FOR CONNECTING TWO FURNITURE PARTS

This application claims the benefit under 35 USC 119(a)-(d) of German Application No. 20 2015 103 874.7 filed Jul. 23, 2015, the entirety of which is incorporated herein by reference.

FIELD OF THE INVENTION

The present invention relates to a device for connecting two furniture parts, a connecting element for a device for connecting two furniture parts, a fitting having a device, a drawer and a furniture item.

BACKGROUND OF THE INVENTION

A known device for connecting two furniture parts is configured, for instance, as a clamping eccentric, wherein the clamping eccentric is provided with a clamping curve running eccentrically to a rotational axis and with a radially running lead-in opening for the introduction of a clamping head into the region of the clamping curve. The clamping eccentric is inserted, for instance, into a blind-hole bore of a furniture part. In addition, the furniture part has a transverse bore, which extends into the blind-hole bore. That lower region of the clamping eccentric which is facing toward the blind-hole bore has in relation to the circular round surface of the clamping eccentric a protruding shell surface. When the clamping eccentric is rotated out of the preassembly position in the direction of the transverse bore, this shell surface enters into a clamping position in the blind-hole bore.

SUMMARY OF THE INVENTION

The object of the present invention is to provide a comparatively cheap device for connecting two furniture parts.

The present invention is based on a device for connecting two furniture parts. The device comprises a housing arrangeable on a first furniture part and an eccentric element rotatably mounted in the housing. The housing is flattened on one wall side and the flattened wall side of the housing has a continuous opening. The eccentric element is configured to cooperate with a connecting element which is arrangeable on a second furniture part. Moreover, the connecting element can be coupled with the housing and the eccentric element such that the first and the second furniture part are fixedly connected to each other.

The fundamental aspect of the present invention can be seen in the fact that the continuous opening in the housing on the flattened wall side is fully enclosed at the margin by wall portions.

The first furniture part can be a base element of a furniture item, in particular, a base element of a drawer. The second furniture part can be a wall element of a furniture item, for example, a front panel or a rear wall element of a drawer.

The housing can be inserted, in particular, from below, into a large flat side face of the first furniture part, in particular, the drawer base. The device is hence not visible to a user of the furniture part who, in normal usage, views the furniture part solely from the side or from above.

Advantageously, the housing is inserted into a prepared bore into the first furniture part. This enables a comparatively cheap production of the first furniture part. The bore is advantageously made on a large flat side face of the first furniture part, for instance, on the upper and/or lower face of a drawer base. In this case, the bore can be realized as a blind-hole bore.

Moreover, the center of the bore axis is advantageously arranged at a shorter distance than the bore radius to an outer edge of the first furniture part. As a result, a narrow side face of the first furniture part acquires a breach in the region of the blind-hole bore. An additional transverse bore which may have been necessary can thereby be cheaply avoided.

The housing can be inserted into the, for example, blind-hole bore such that the flattened wall side having the opening closes off the breach and the first furniture part is visible from a side view onto the narrow side.

Advantageously, the housing is inserted in the first furniture part such that the flattened wall side of the housing is flushly joined together with the narrow side of the first furniture part.

The housing preferably possesses side walls, wherein on one side wall and/or on one region of a side wall is provided the flattened wall side having the continuous opening, in particular, the flattened wall side is an outer side of the housing and/or a constituent of an outer side of the housing. The housing additionally comprises a top wall, which stands, for example, perpendicular to the side walls.

Preferably, the housing is at the side walls cylindrical, with a cylinder axis which falls on a center axis of the housing. The cylindrical housing has, for instance, a comparatively smaller external diameter than the bore of the first furniture part. The housing is thus designed, for example, in the shape of a pot. It is hereby possible to insert the housing advantageously, in Particular, in a toolless assembly, into a bore in the first furniture part, for instance, with, say, a 32 mm diameter as the standard bore.

Moreover, the housing can have inner housing portions, with which the eccentric element inserted into the housing is rotatably guided and positioned.

Furthermore, the eccentric element can be inserted and/or slid along a center axis of the housing, in particular, parallel thereto, into the housing. Favorably, in the inserted state of the eccentric element in the housing, a rotational axis of the eccentric element rests on the center axis of the housing. It is also possible, however, for an axis of rotation of the eccentric element, when the latter has been inserted in the housing, to be oriented in particular perpendicularly to the center axis of the housing.

The eccentric element may be produced from a metal, wood and/or plastic or a combination of these materials.

In a further advantageous variant of the present invention, the eccentric element is of lever-like configuration, wherein a clamping element is arranged at a first end of the eccentric element, and wherein the eccentric element comprises an assembly element at the second end.

The lever-like eccentric element may advantageously be designed such that it is introduced into the housing, with the second end, e.g. its assembly end, in front, parallel and/or more or less parallel to the center axis, for example, over an angle range or cone-angle range between ±30°, and/or along the center axis and/or parallel and/or more or less parallel to a side wall of the housing and has its assembly element for example plugged and/or slid through the housing.

The center axis of the housing stands preferably perpendicular to the top wall and parallel to the side walls of the housing and is, in particular, distanced uniformly far from the side walls in perpendicular distance to the side walls.

The housing can consist, for instance, of metal, advantageously of diecast material, in particular plastic or a combination of materials. The housing can be produced comparatively cheaply in an injection molding and/or diecasting process.

The first and second furniture part can be put together in a known manner such that, in the mounted state of the device, the narrow side of the first furniture part butts flushly against a large side face of the second furniture part.

In an advantageous embodiment of the device, the opening in the housing is designed such that the connecting element, in a movement perpendicular to the flattened wall side in the direction of the eccentric element, can be slid, projecting through the opening, into the housing.

The connecting element is fastened, for example with its first end, to the second furniture part, and is arranged with its second end protruding from the second furniture part.

In an assembly process, the connecting element is slid with the second end perpendicular or substantially perpendicular or at possibly a predefined tilt angle to the narrow side face, in the direction of the premounted housing and the eccentric element, through the opening in the housing and into the housing and the eccentric element. In the mounted state of the two furniture parts and the device, the connecting element hence juts with its second end through the opening and into the housing and the eccentric element.

The tilt angle lies preferably within a range between 0° and 45°, in particular within a range between 0° and 30°.

The eccentric element can additionally be designed in a known manner such that, as a result of a rotation operation of the eccentric element in the course of an assembly, a force acts on the connecting element, inserted with the second end into the eccentric element, with a force direction parallel to the top wall of the housing and perpendicular to the narrow side face of the first furniture part. The force can be generated by a known device on the eccentric element, for instance, an eccentric acting device, which device acts on the second end of the connecting element.

It is also advantageous that on an end face of the eccentric element is configured an assembly element.

It is possible, for example, for an assembly tool, for instance a screwdriver and/or an Allen key, to engage in the assembly element of the eccentric element. It is hereby possible to rotate the eccentric element about its rotational axis comparatively easily with the assembly tool. In particular, on each end face of the eccentric element an assembly element for an assembly tool can be configured. The eccentric element is advantageously inserted into the housing with one of the end faces, and the second end face is arranged on the eccentric element, for example, parallelly opposite to the first end face.

It is also advantageous that an axis of rotation of the eccentric element, when the latter is inserted in the housing, is oriented perpendicularly to the flattened wall side.

It is also possible for a user to operate the assembly element, which is arranged for example on the lever-like eccentric element, directly, for example using his hands and/or fingers. For example, a user can swing and/or rotate the eccentric element about an axis of rotation by applying force to the assembly element.

It is also advantageous that a supporting Portion of the flattened wall side is configured as a region which is deformable in a standard assembly.

The supporting portion of the flattened wall side is configured, for instance, as an elastic element and/or spring element. The supporting portion can also, however, be designed such that it plastically deforms in the standard assembly.

Advantageously, in the mounted state of the device and the furniture parts, the supporting portion acts counter to the direction of force which the eccentric exerts on the connecting element. As a result, a dynamic support counter to the direction of force of the eccentric element is generated and braces the connecting element, in particular, in a predefined manner.

Moreover, it is of advantage that the flattened wall side of the housing has on its outer side, in particular on an outer side of the housing, on its surface, a structure.

For instance, the outer side has a surface structure in the form of a transverse and/or longitudinal ribbing. The ribbing can also be realized obliquely on the outer side, for instance at an angle of 45° to the center axis of the housing. It is also conceivable for the surface of the outer side to have an additional ribbing rotated through 90° relative to the first ribbing. As a result, the surface of the outer side is realized as a so-called knurled surface. This ribbed or grooved structure enables a vertical and/or longitudinal adjustment of the two furniture parts relative to each other in the course of the assembly.

In addition, the connecting element can advantageously be supported by the surface structure against the flattened wall side of the housing in the mounted state.

In an advantageous modification of the invention, on an end-face region of the eccentric element is arranged a clamping element, wherein the eccentric element, with the side lying opposite the clamping element, may be firstly inserted into the housing.

Advantageously, the clamping element can also be arranged on an end face of the eccentric element.

The clamping element is arranged, for example, on the eccentric element in such a way that it lies, in the mounted state of the device, on the side facing toward the first furniture part.

Advantageously, the clamping element is arranged protruding, for instance radially protruding, from the side faces of the eccentric element, in particular, perpendicular to a connecting axis of the two end faces of the eccentric element and/or a connecting axis of the two ends of the lever-like eccentric element.

For instance, the clamping element is configured as a flat disk and is fixedly arranged or clamped with a flat side to an end face of the eccentric element. The disk can here have a greater radius than the distance of the side face of the eccentric element to the connecting axis of the end faces. In particular, the disk is arranged centrally on the end face of the eccentric element.

Furthermore, it is of advantage that the clamping element is configured as a flat disk having a recess.

Preferably, the clamping element is a disk and is configured flattened on a narrow side. In particular, on the flattened narrow side is configured an opening, for instance a slot or gap in the direction of the disk center. It is thereby possible to insert the connecting element, coming from the end face of the eccentric element, through the opening in the clamping element into the eccentric element.

In an advantageous embodiment, the clamping element possesses a recess. It is thereby possible to engage with an assembly tool, through the recess, in an assembly element of the eccentric element and to thereby rotate the eccentric element, for instance, and to clamp the device to the connecting element.

It is also possible, however, for the clamping element to be configured in the form of element which is wedge-shaped and/or tapered in one direction, advantageously in a direction of rotation and/or movement of the eccentric element, and so as to protrude on the eccentric element.

Moreover, it is of advantage that a top wall of the housing is arranged overhanging a side wall of the housing.

The top wall of the housing is configured, for instance, as a flat plate element having a comparatively larger base area than the contour of the side walls which delimit the housing. As a result, the to, wall advantageously overhangs at least one side wall portion of the housing. In particular, the top wall is configured and arranged on the housing such that it does not overhang the wall portion of the flattened wall side. Preferably, the top wall is arranged flush to the flattened wall side. In particular, one region of the top wall may be a constituent of the flattened wall side.

In the arranged state of the housing on the first furniture part, the top wall is advantageously arranged on that side of the housing which is facing away from the first furniture part and esthetically covers unattractive bore edges of the first furniture part.

Moreover, it is advantageous if the top wall has a recess, whereby it is made possible to operate with an assembly tool an eccentric element inserted in the housing and to rotate the eccentric element comparatively easily. It is also possible for the recess of the top wall to allow the for example lever-like eccentric element to be plugged and/or slid through the top wall by way of its second end, for example, the assembly element.

It also proves advantageous that the housing comprises a locking member.

The locking member serves, for example, as a rotation prevention and can be arranged on the opposite side of the opening in the housing on the top wall, protruding in the same direction as the side walls of the housing. Preferably, the locking member is configured such that it protrudes over a shorter distance in comparison to the side walls.

Advantageously, the locking member can be clamped and/or bonded and/or welded and/or screwed and/or riveted to the top wall, in particular, the housing is produced with the top wall and the locking member as one unit, for instance, by means of an injection molding process.

The locking member is configured, for instance, cylindrically as a pin and, via the top wall, is advantageously coupled in a rigid and mechanically stable manner with the housing.

It is further proposed that a coupling means is arranged on that side of the top wall which lies opposite the side walls.

A coupling element, for instance, a synchronizing rod, can be movably arranged on the coupling means. The synchronizing rod can here act on two separately arranged ejection units and serves to synchronize the working of the election units.

The coupling means can also however be configured to cooperate directly with an ejection unit.

It is also of advantage that the connecting element is of multi-part, in particular two-part, configuration, comprising a dowel member and a coupling member.

Advantageously, the connecting element comprises a dowel member, a coupling member and an adjustment member.

In its outer contour, the connecting element is advantageously designed approximately as a connecting bolt having a superb longitudinal axis.

Advantageously, the connecting element is composed of a dowel member, produced, for instance, from plastic, and a coupling member, produced preferably from diecast material, in particular, from plastic.

The plastics of the dowel member and of the coupling member advantageously differ in their physical properties.

The dowel member forms the first end of the connecting element and is inserted, in the assembled state, parallel to the longitudinal axis of the connecting element into the second furniture part. The coupling member forms the second end of the connecting element and is slid in the assembled state, in the direction of the longitudinal axis of the connecting element, through the opening into the housing and into the eccentric element.

BRIEF DESCRIPTION OF THE DRAWINGS

Two illustrative embodiments are explained in greater detail on the basis of the following schematic drawings, specifying further details and advantages, wherein.

DETAILED DESCRIPTION OF THE INVENTION

Figure 1:
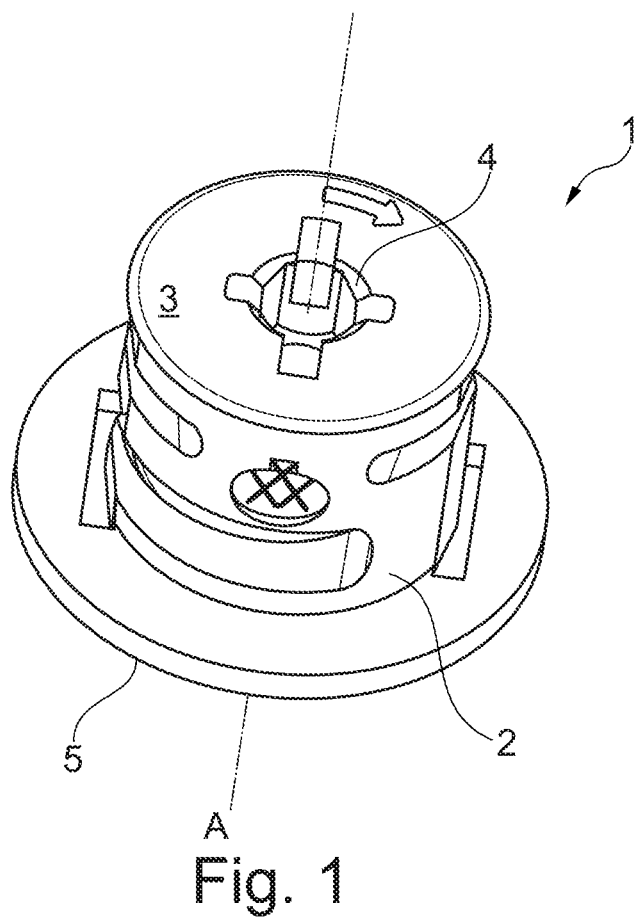
FIG. 1 shows a perspective view of a first variant of an eccentric element from laterally above.
Figure 2:
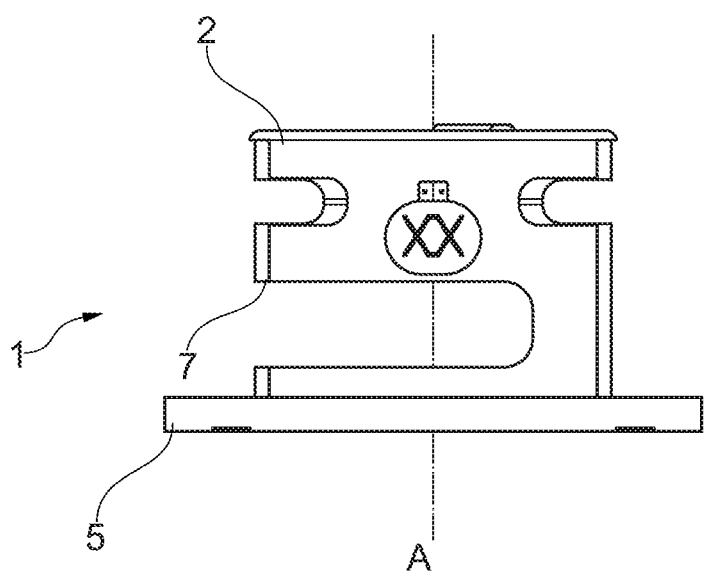
FIG. 2 shows a side view of the eccentric element from FIG. 1.
Figure 8:
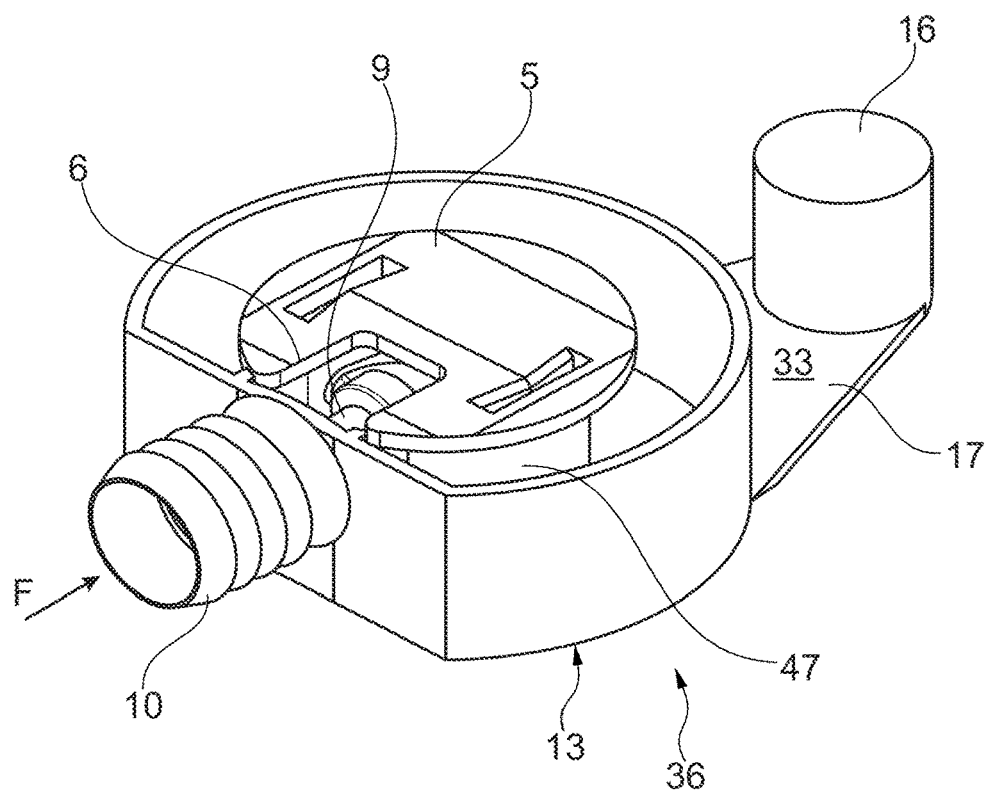
FIG. 8 shows a perspective side view from front and bottom of a device according to the present invention comprising the housing, the eccentric element and the connecting element arranged thereon.
Figure 9:
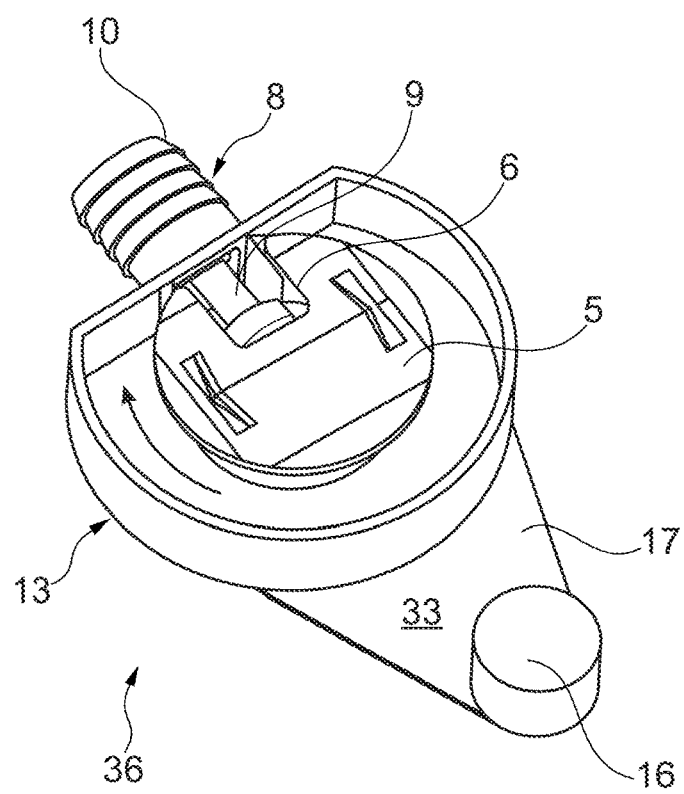
FIG. 9 shows a further perspective side view from rear and bottom of the device according to FIG. 8.

In FIGS. 1 and 2 is represented an eccentric element 1, which comprises a cylindrical main body 2 having a cylinder axis A. On an end face 3 of the cylindrical main body is configured an assembly element 4. On that end face of the main body 2 which lies opposite the end face 3 is arranged a clamping element 5, which is configured as a circular flat disk having a greater radius than the cylindrical main body 2 of the eccentric element 1. The clamping element 5 is provided, for example, on one side with a recess 6 (FIGS. 8, 9). The recess 6 is designed such that, on the one hand, an outer portion of the disk-shaped clamping element 5 is flattened and, on the other hand, at this flattened spot is configured a protrusion, through which a coupling member 9 of a connecting element 8 can be inserted, parallel and/or at a defined angle to the cylinder axis A from above into the eccentric element 1. Moreover, on the cylindrical periphery of the main body 2 is configured a slot-like opening 7, into which a coupling member 9 of a connecting element 8 can be inserted, perpendicular and/or at a defined angle to the cylinder axis A, into the eccentric element 1.

Figure 3:
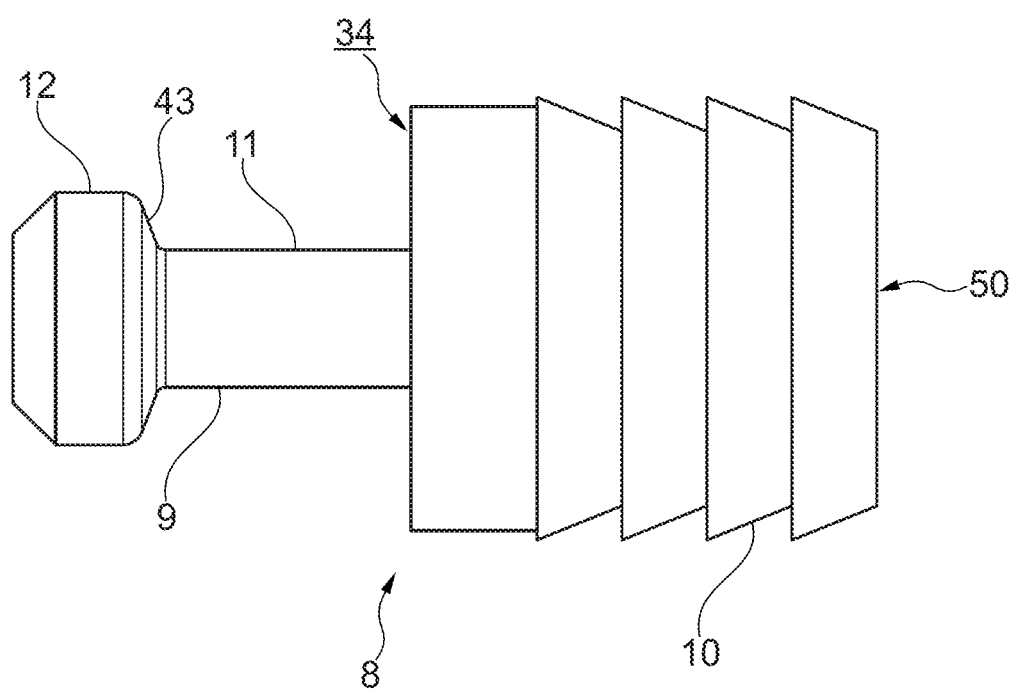
FIG. 3 shows a side view of a connecting element.

The pin-like connecting element 8 comprises at its first end the coupling member 9 and at the second end a dowel member 10 (FIG. 3). The coupling member 9 is configured as a cylindrical pin 11 and a head 12, which is arranged on the latter and is disposed at the free first end of the connecting element 8. The head 12 is designed such that the slot-like opening 7 in the eccentric element 1 can back-grip the head 12 on its side 43 facing away from the free first end. The dowel member 10 is of cylindrical design and has, for example, a greater diameter than the head 12 and the pin 11. On its outer side, the dowel member 10, viewed in cross section, is of predominantly jagged design in terms of its silhouette. On that side which is facing away from the second free end of the connecting element 8, the dowel member 10 additionally has a contact surface 34.

Figure 4:
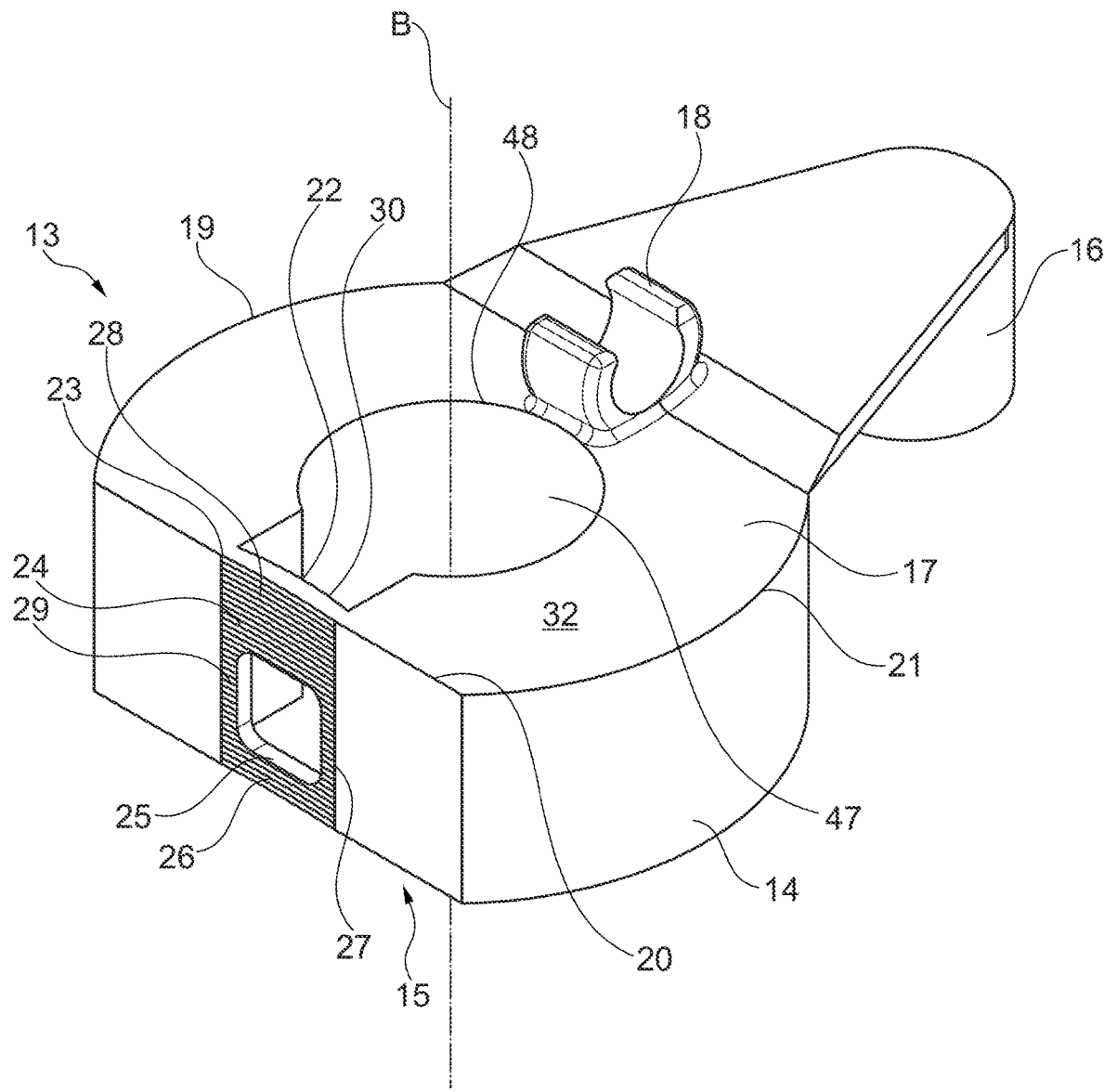
FIG. 4 shows a perspective view of a first variant of a housing from laterally above.
Figure 5:
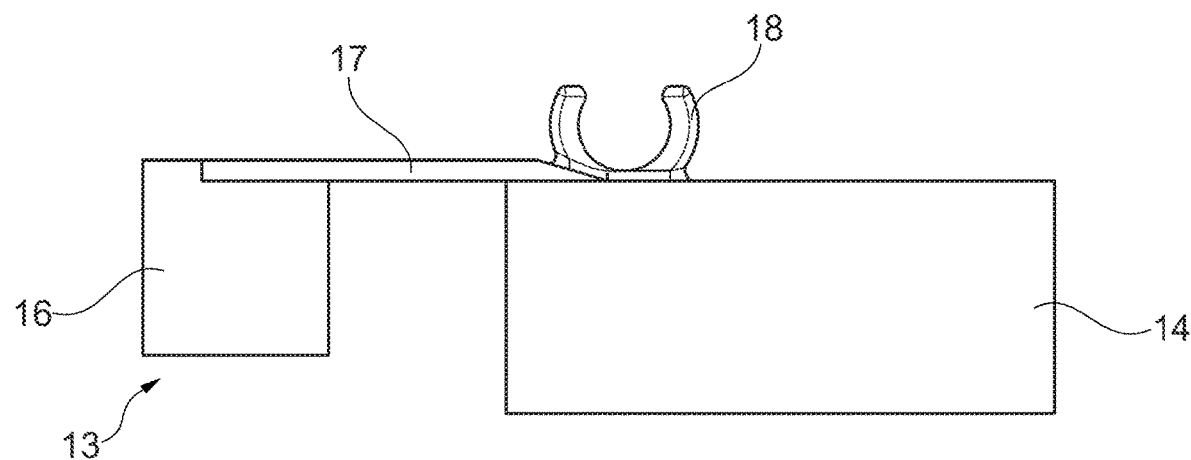
FIG. 5 shows a side view of the housing from FIG. 4.

A housing 13 of a device 36 according to the present invention is shown in FIG. 4. The housing 13 possesses a cylindrical side wall 14, having a flattened wall side 15, and a locking member 16, which is fixedly connected by a top wall 17 to the side wall 14. The top wall 17 is oriented perpendicular to the side wall 14 and the flattened wall side 15 and the locking member 16, and is arranged fixed to these. Moreover, the side wall 14, the flattened wall side 15 and the locking member 16 are arranged on a wall side 33 of the top wall 17, protruding in the same direction (FIGS. 8, 9). On a wall side 32, lying opposite the wall side 33, of the top wall 17 is protrudingly configured a coupling means 18. Moreover, on the housing 13 is configured a housing portion 47, which guides an eccentric element 1 inserted in the housing 13 movably, particular, rotatably about the cylinder axis A.

Figure 6:
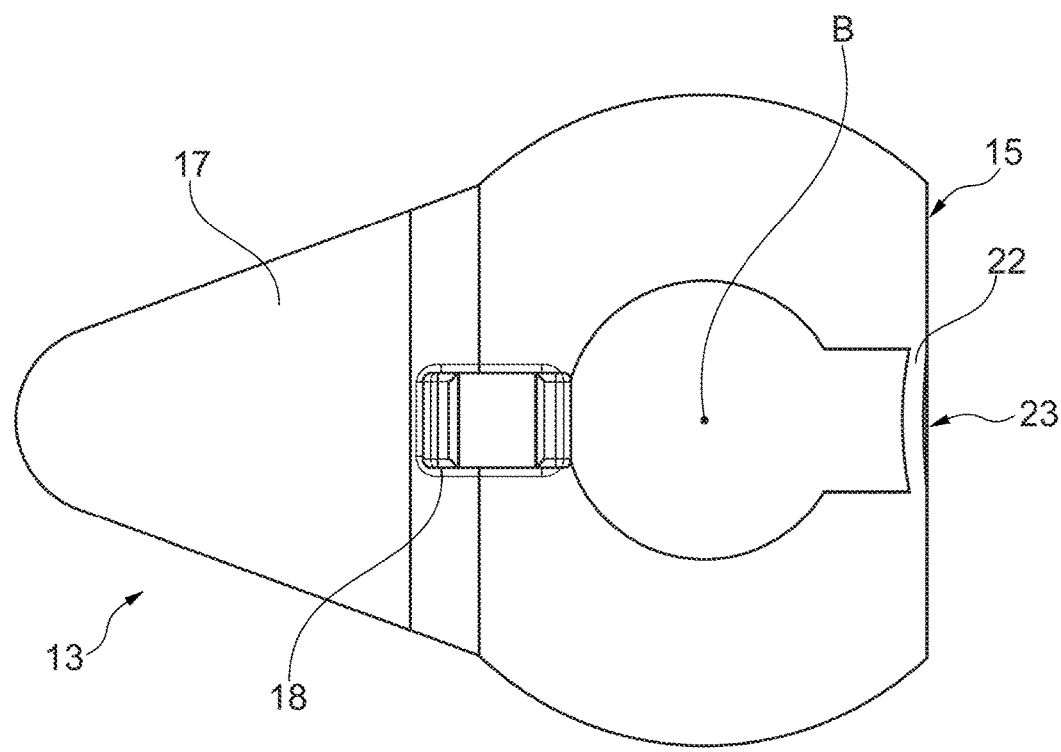
FIG. 6 shows a plan view from above of the housing from FIG. 4.

Viewed in a plan view of the housing 13, the top wall 17 is realized in its outer contour 19, 20, 21 flush with the side wall 14 and the flattened wall side 15 (FIGS. 4, 6). Moreover, the housing portion 47 ends at the top wall 17 in an assembly opening 48. The assembly opening 48 enables an assembly tool to engage in the assembly element 4 of the eccentric element 1.

On the flattened wall side 15 is configured a supporting portion, for instance, in the form of a spring element 22. The spring element 22 has on its outer side 23 a surface structure 24. Moreover, on the spring element 22 is configured an opening 25. The opening 25 is fully enclosed at the margin by wall portions 26 to 29. Moreover, the spring element 22 may be designed such that it is arched with its outer side 23 and its inner side 30 in the direction of a center axis B of the housing 13. As a result of this design, the spring element 22 is pretensioned.

The opening 25 is designed, moreover, such that the connecting element 8 can be slid with its coupling member 9, coming from the outer side 24, through the opening 25 in the direction of the center axis B into the housing 13.

Figure 7:
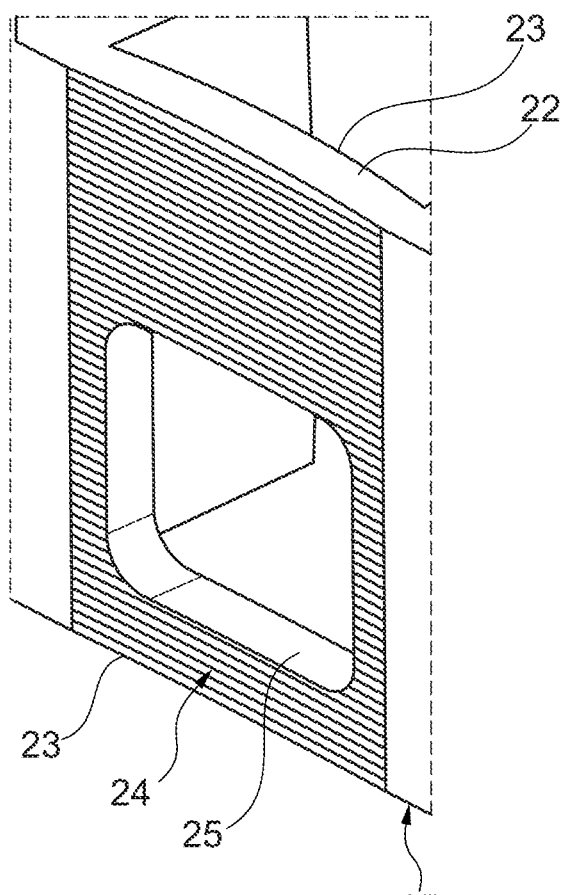
FIG. 7 shows a perspective partial view from FIG. 4 of a continuous opening in the housing.

The outer side 23 of the spring element 22 has a groove-like surface structure 24. The grooved structure is oriented, for example, parallel to the surface 32 of the top wall 17 (FIG. 7).

As represented in FIGS. 8, 9, the eccentric element 1 is firstly inserted with its end face 3 in the direction of the inner face 33 of the top wall 17 into the housing portion 47 of the housing 13. In the mounted state, the clamping element 5 of the eccentric element 1 rests movably on a narrow side face of the housing portion 47. Furthermore, in a first assembly step, the eccentric element 1 is oriented such that the connecting element 8 can be slid through the opening 25 in the direction of the center axis B of the housing 13 into the housing 13 and into the slot-like opening 7 in the eccentric element 1.

Figure 11:
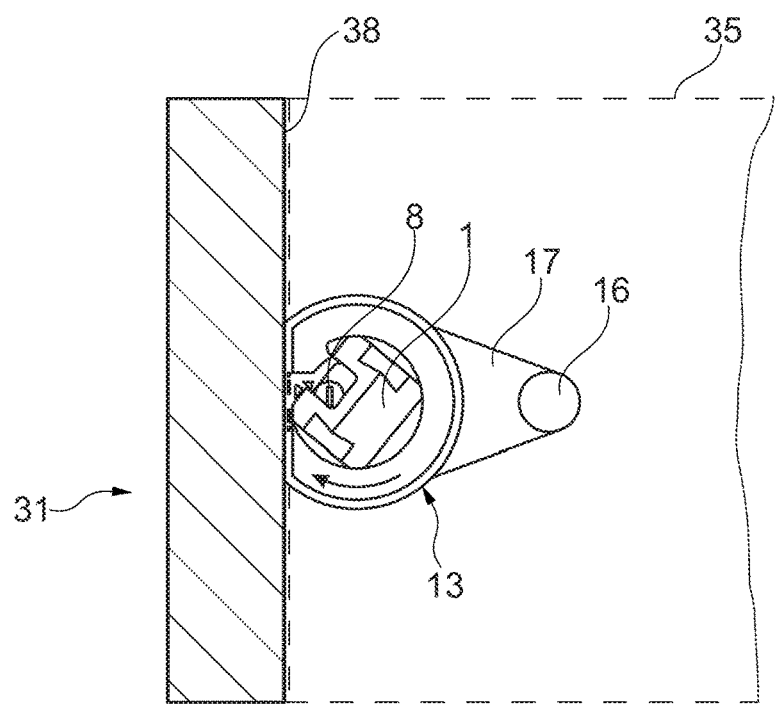
FIG. 11 shows a plan view from above of the arrangement according to FIG. 10.
Figure 12:
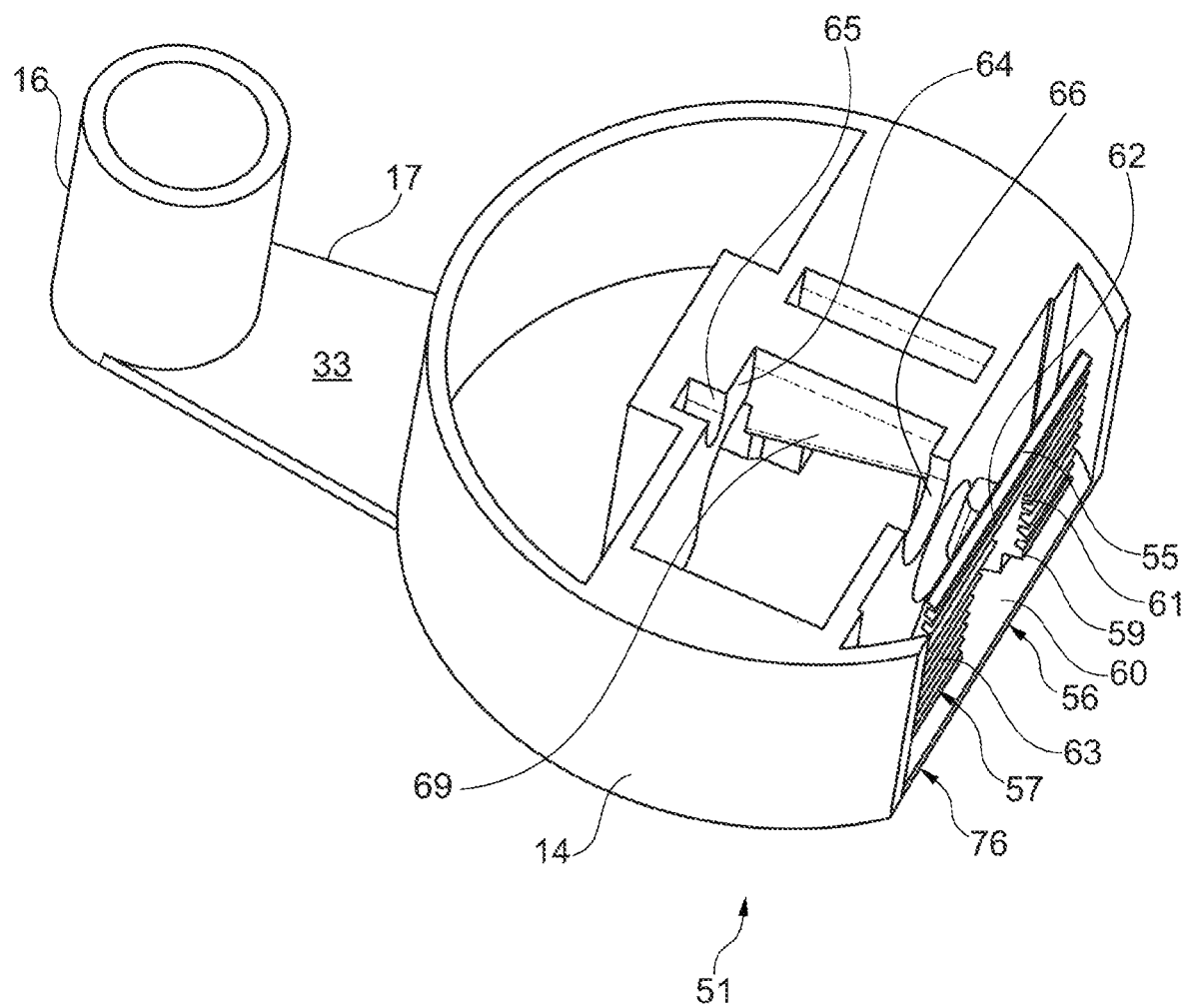
FIG. 12 shows a perspective view of a further variant of a housing according to the present invention, as seen laterally from beneath.

In order in a following assembly step to fix the connecting element 8 relative to the housing 13, the eccentric element 1, from a view from below, looking at the inner face 33 of the top wall 17, is rotated in the clockwise direction (FIGS. 9, 11). As a result of the rotation, the slot-like opening 7 in the eccentric element 1 back-grips the head 12 of the coupling member 9 of the connecting element 8 and pulls the connecting element 8 with a force F in the direction of the rotational axis A of the eccentric element 1 into the housing 13 or the eccentric element 1 (FIG. 8).

Figure 10:
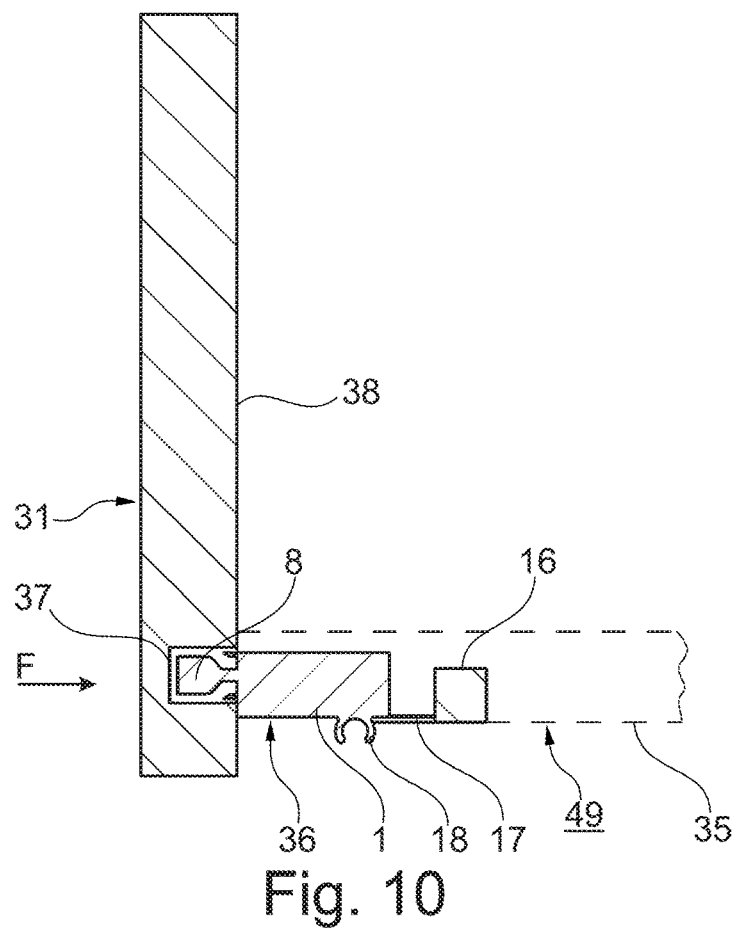
FIG. 10 shows a side view of a cross section through the device according to FIG. 8 and of a drawer front and a drawer base (indicated in dashed representation)

A cross section of the device 36 in the arranged and mounted state, which device is disposed on a first furniture part, a drawer front 31 and a second furniture part, a drawer base 35 (shown in transparent representation, silhouette indicated by dashed lines), is shown in FIG. 10.

A housing 51 of a further variant of the present invention is illustrated in FIGS. 12 and 14 to 19. The housing 51 has a supporting portion, which is configured in the form of a, for example, wedge-shaped wall element 55. The wall element 55 is, in particular, free-standing and connected, for example, to the top wall 17. The wedge-shaped wall element 55, for example at the thicker end of the wedge shape, is arranged on the flattened wall side 76, in particular, on the top wall 17, of the housing 51.

A surface of the outer side 56 of the wall element 55 has formed on it, for example, a groove-like surface structure 57, which is oriented for example parallel to the wall side 33 of the top wall 17. Also formed on the wall element 55 is a continuous opening 59, which is enclosed at the margin by wall portions 60-63.

The housing 51 also comprises a housing portion 64, into which can be inserted, in a first assembly step, an eccentric element 52 and, in a following assembly step, the connecting element 58. The connecting element 58 is inserted into the housing 51 through the opening 59, as already described in the first embodiment.

Two bearing members 65, 66 are present on the housing portion 64, and matching bearing elements 67, 68 of the eccentric element 52 can be inserted into the same. It is possible here for a bearing axis and/or axis of rotation C of the bearing members 65, 66 to be oriented perpendicularly to a center axis of the housing and parallel to a mounting direction D of the connecting element 58 and/or a force direction D of the eccentric element 52.

The housing portion 64 may also have formed on it a clamping means 69, by way of which a coupling member 70 of the connecting element 58 can be retained with clamping action in the assembled state of the furniture parts 31, 35 and of the device 81 according to the present invention.

Figure 13:
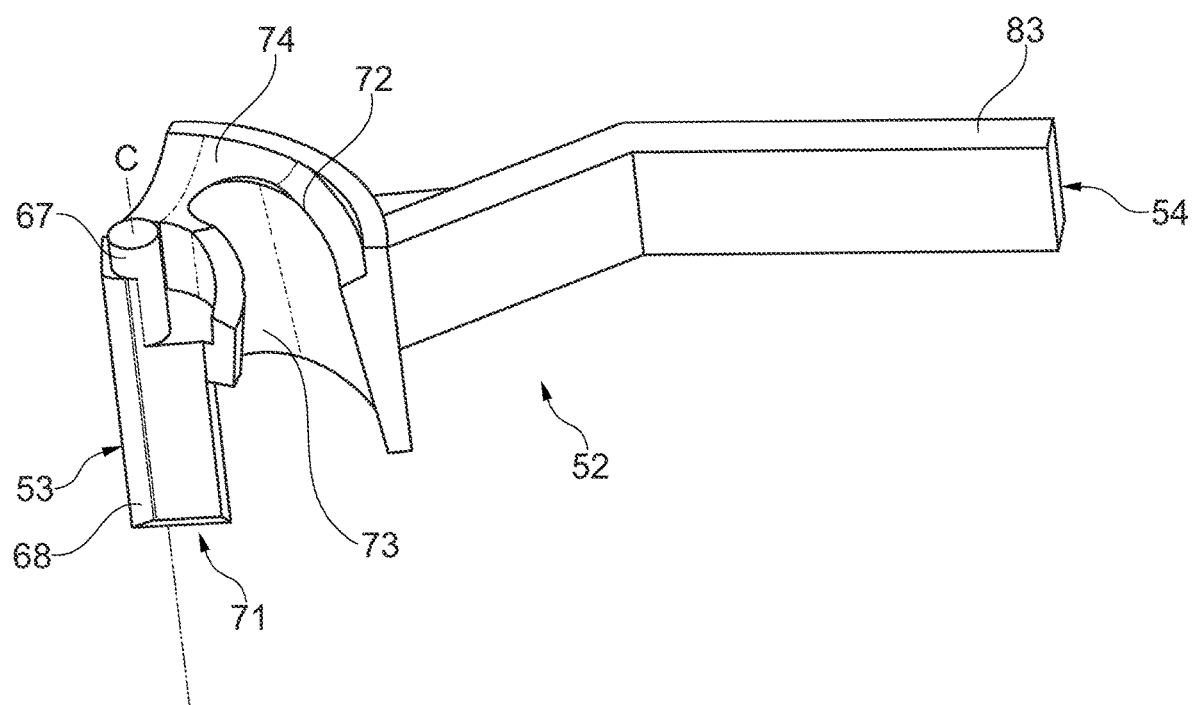
FIG. 13 shows a perspective view from the side of a further lever-like eccentric element according to the present invention.

FIG. 13 shows the lever-like eccentric element 52. The eccentric element 52 comprises, at a first end 53, the bearing elements 67, 68, a clamping element 71, an opening 72, a clamping element 73 and a clamping member 74. An assembly element 83 is formed at the second lever-like end 54, and a user can grip the assembly element, for example, in his fingers.

The second end 54 of the eccentric element 52 may be configured in the form of an elongate, narrow, strip-like element and is arranged, for example, at an angle to the first end 53 of the eccentric element 52. The first end 53 is similar, in terms of its outer contour, for example, to a piece of cake, wherein the bearing elements 67, 68 are formed opposite one another on a tapering portion of the first end 53.

The eccentric element 52 is slid into the housing 51 first of all with its second end 54, the assembly element 83, in front and has its second end 54 slid through the housing 51, and the top wall 17 of the housing 51, until the eccentric element 52 has its bearing elements 67, 68 butting against and/or resting on the bearing members 65, 66. It is thus possible for the eccentric element 52 to be inserted into the housing 51 such that its first end 53 is arranged in the housing 51 and its second end 54 is arranged outside the housing 51.

Figure 14:
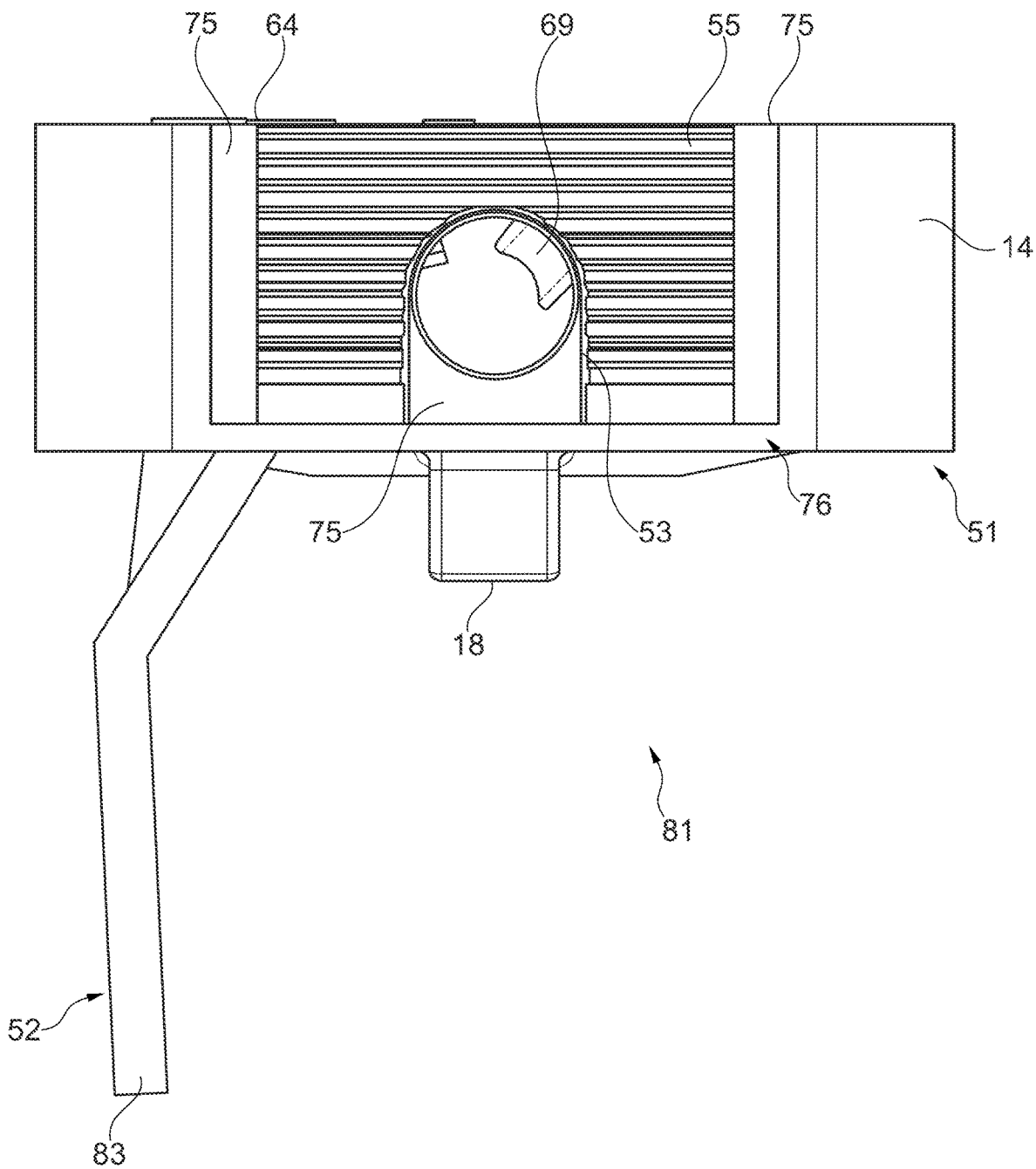
FIG. 14 shows a side view of a flattened wall side of the housing from FIG. 12 with the eccentric element from FIG. 13, which has been inserted into the housing, in an opened position.
Figure 15:
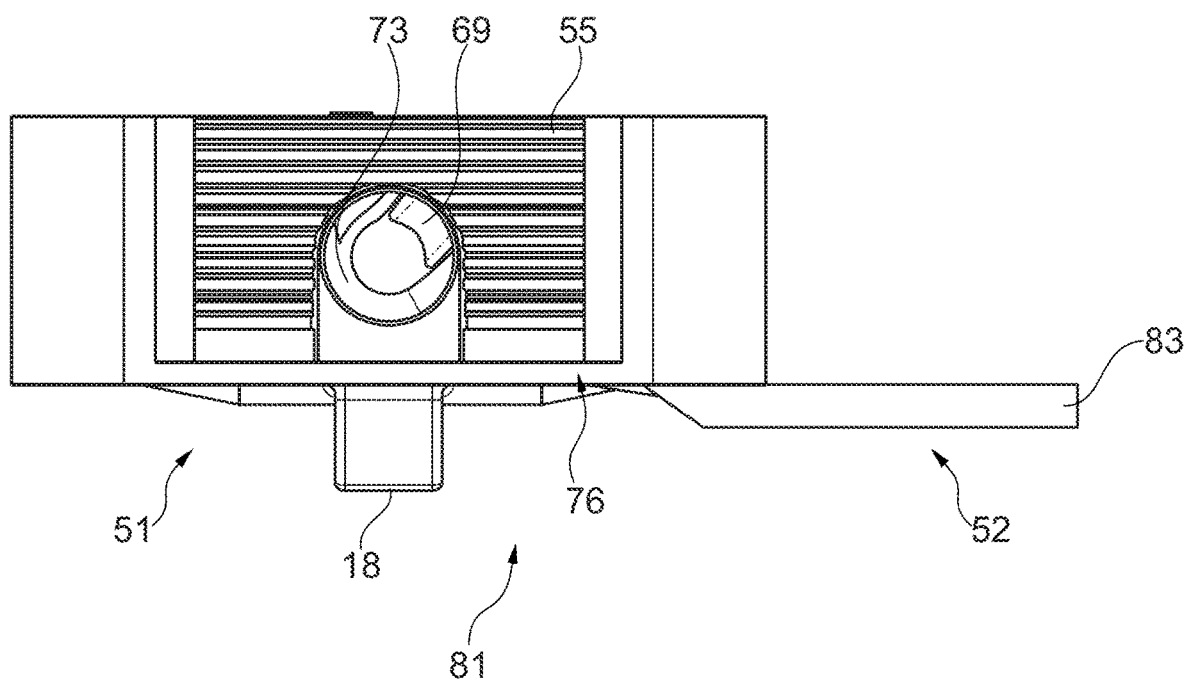
FIG. 15 shows a side view according to FIG. 14 in a closed position.
Figure 16:
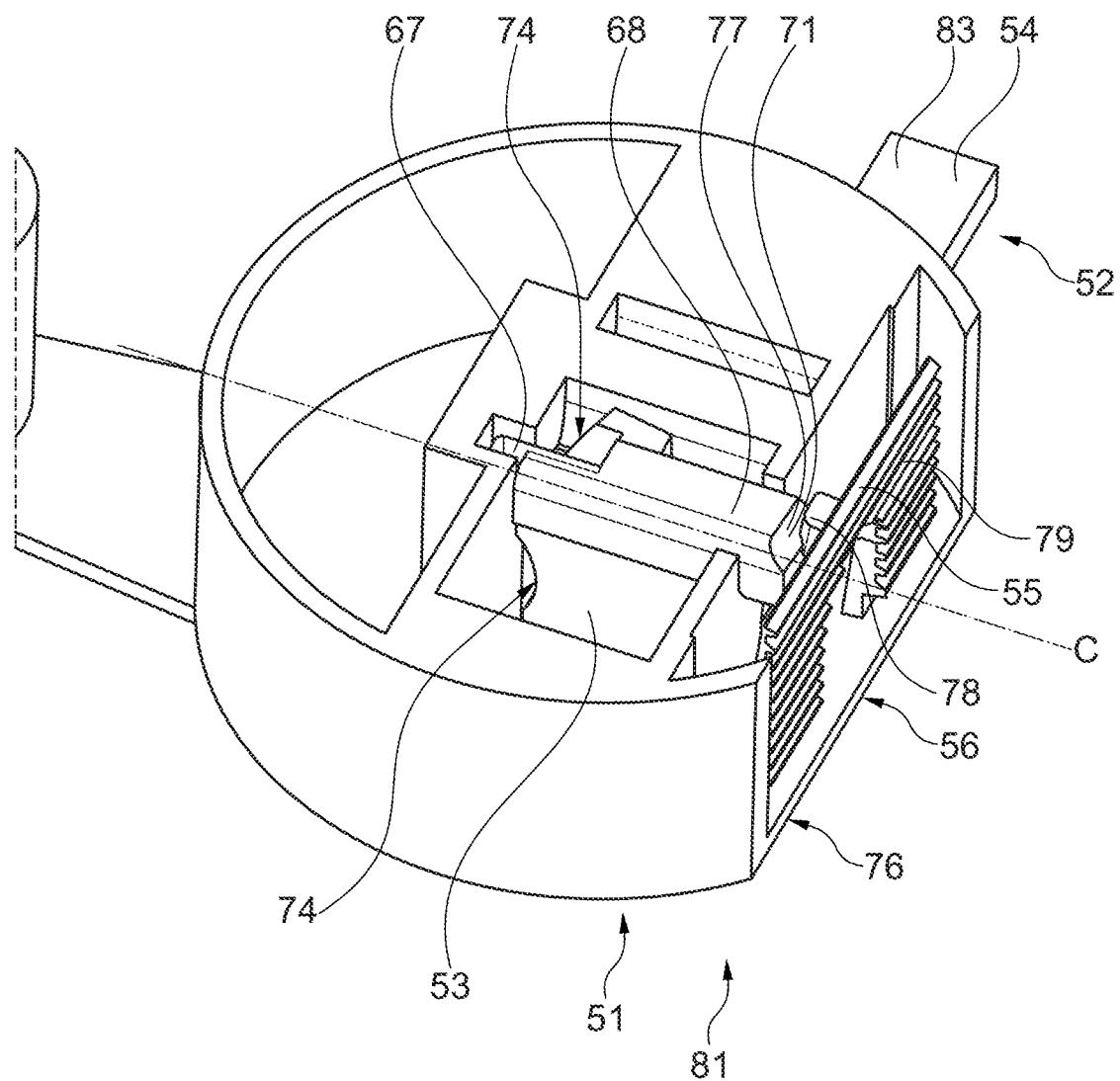
FIG. 16 shows a perspective view of the arrangement according to FIG. 15, as seen laterally from beneath.

In a side view of the flattened wall side 76 of the housing 51 with the eccentric element 52, which has been pushed into the housing 51, in an open position, the clamping means 69 and a housing wall 75 are shown within the opening 59 of the wall element 55. In a closed position of the eccentric element 52 in the housing 51, it is additionally possible to see the clamping element 73 of the eccentric element 52 (FIGS. 14 and 15).

The clamping element 73 is of, for example, funnel-shaped configuration, wherein the funnel shape of the clamping element 73 can taper in the direction of the housing interior. This allows the connecting element 58 to be introduced and/or slid and/or inserted into the housing 51, and into the eccentric element 52, in a comparatively straightforward and/or directed or guided manner. It is also possible for the clamping element 73 in the closed state, together with the clamping means 69 of the housing 51, to retain a connecting element 58, which has been inserted into the housing 51, for example with clamping action.

It is advantageously possible for the eccentric element 52 to be shifted from an open position (FIG. 14) into a closed position (FIG. 15) on the housing 51 by a user moving the second end 54 of the eccentric element 52, for example, the assembly element 83, by a rotary movement in the direction of the top wall 17 in an advantageously straightforward manner by subjecting the second end to a force, e.g. finger pressure. The axis of rotation of the rotary movement here is advantageously the bearing axis C. In the closed state of the eccentric element 52, the assembly element 83 is in abutment with, and/or oriented parallel to, the top wall 17.

With the eccentric element 52 in the closed state on the housing 51, furthermore, the clamping element 71, which has for example a slope 77, pushes against a stop member 78 of the wall element 55. This advantageously results in the wall element 55 being moved and/or pushed, in an upper region 79, counter to the force direction D of the eccentric element 52 (FIG. 16) on account of the action of force of the clamping element 71 and of the advantageously wedge-shaped wall element 55, which tapers in the direction of the upper region 79.

The connecting element 58 may comprise a plate-like adjustment member 50, which is arranged approximately in the center of the connecting element 58, following a dowel member 80, for example on the dowel member 80. The adjustment member 50 may have a groove structure 82 on the side facing away from the dowel member 80. It is possible here for the groove structure 82 to be designed such that it can interact with the groove-like surface structure 57 of the wall element 55.

Figure 17:
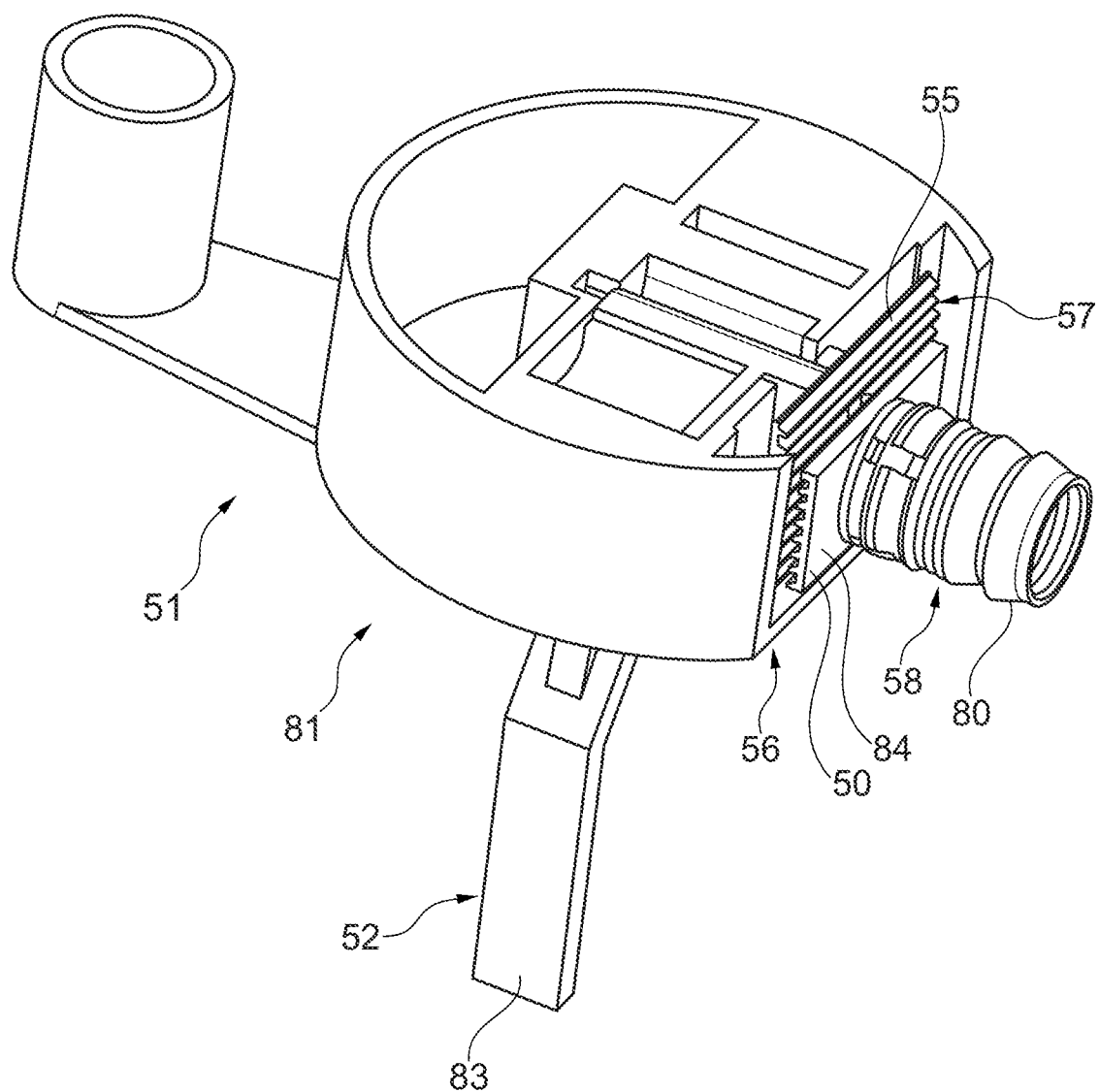
FIG. 17 shows a perspective view of the arrangement according to FIG. 14, with the connecting element pushed in, as seen laterally from beneath.
Figure 18:
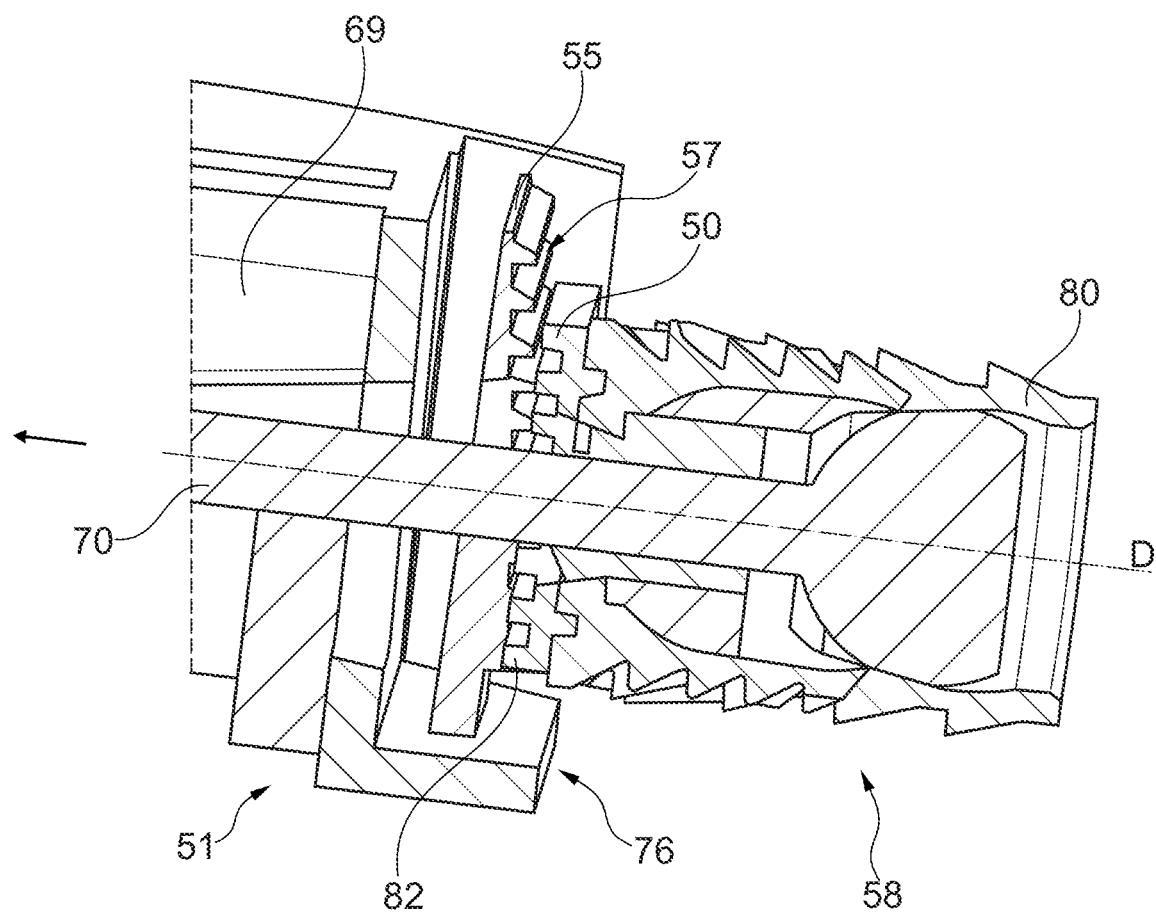
FIG. 18 shows a cross section, taken Perpendicularly to the flattened wall side, through the housing and the connecting element of the arrangement according to FIG. 17.

The advantageous design of the adjustment member 50 and of the wall element 55, in particular, of the groove form of the surface structure 82, makes it possible in the assembled state of the device 81, when the eccentric element 52 is open, for the connecting element 58 to be displaced or adjusted laterally in relation to the housing 51 or the wall element 55, whereas a height adjustment, parallel to a normal of the top wall 17, is rendered difficult, or prevented altogether, on account of the groove structure (FIGS. 17 and 18).

Figure 19:
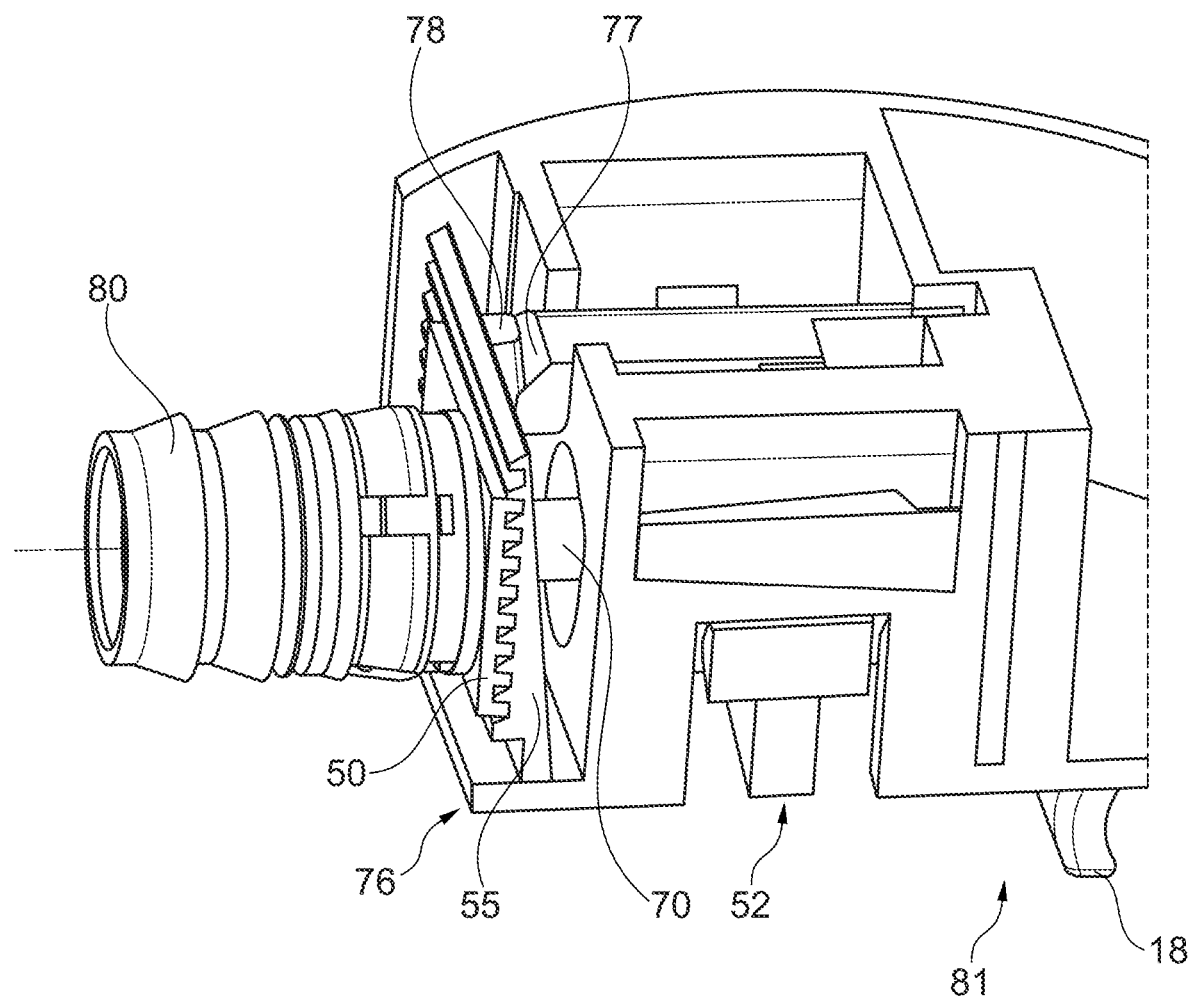
FIG. 19 shows a cross section through the housing, taken perpendicularly to the flattened wall side, in the closed position.

During the course of the closing movement of the eccentric element 52 of the device 81 from an open position into a closed position, and with the connecting element 58 inserted, the eccentric element 52, by way of the eccentric design of the clamping member 74, engages behind for example a head of the coupling member 70 of the connecting element 80 and pushes and/or pulls the connecting element 80 in a force direction (D) towards the housing. The head of the connecting element 58 here is designed in a known manner, as described, for example, above. This action of force and the oppositely directed action of force of the clamping element 71 cause the wall element 55 and the adjustment member 50 to be connected in a force-fitting and/or form-fitting manner to one another (FIG. 19).

It is the case, in particular, that the adjustment member 50, arranged on the housing 51 and with the eccentric element 52 in the closed position, has an outer side 84 positioned flush or more or less flush on an outer edge and/or an outer side 56 of the flattened wall side 76 and/or of the second furniture part, for example, an inner side 38 of the drawer front 31.

In the following, the assembly operation of the device 36 is described.

In a first assembly step, the connecting element 8 is inserted with its dowel member 10 into a bore 37 on the inner side 38 of the drawer front 31, and the housing 13, on which the eccentric element 1 is already mounted, is inserted in a corresponding recess in the drawer base 35. The housing 13 is here inserted, with the side wall 14 and the locking member 16 to the fore, in the direction of the recess in the drawer base 35 such that the wall side 32 of the top wall 17 of the housing 13 is oriented parallel and advantageously level with the underside 49 of the drawer base 35, and the flattened wall side 15 of the housing is oriented flush, level and parallel with the narrow end face of the drawer base 35.

In a further assembly step, the connecting element 8 is inserted, with the coupling member 9 to the fore, through the opening 25 in the housing 13 into the housing 13 and into the recess 6 in the eccentric element 1 and, in a following assembly step, the eccentric element 1 is rotated with the aid of an assembly means, as described above. As a result, the contact surface 34 of the connecting element 8 comes squarely into contact against the surface structure 24 of the spring element 22. Moreover, the spring element 22 is additionally pressed by the clamping element 5, counter to the direction of pull of the connecting element 8, outward, counter to the force direction F and in the direction of the drawer front 31, and is clamped against the contact surface 34 of the connecting element 8 (FIGS. 10, 11). This assembly operation fixes the drawer front 31 with the drawer base 35.

Figure 20:
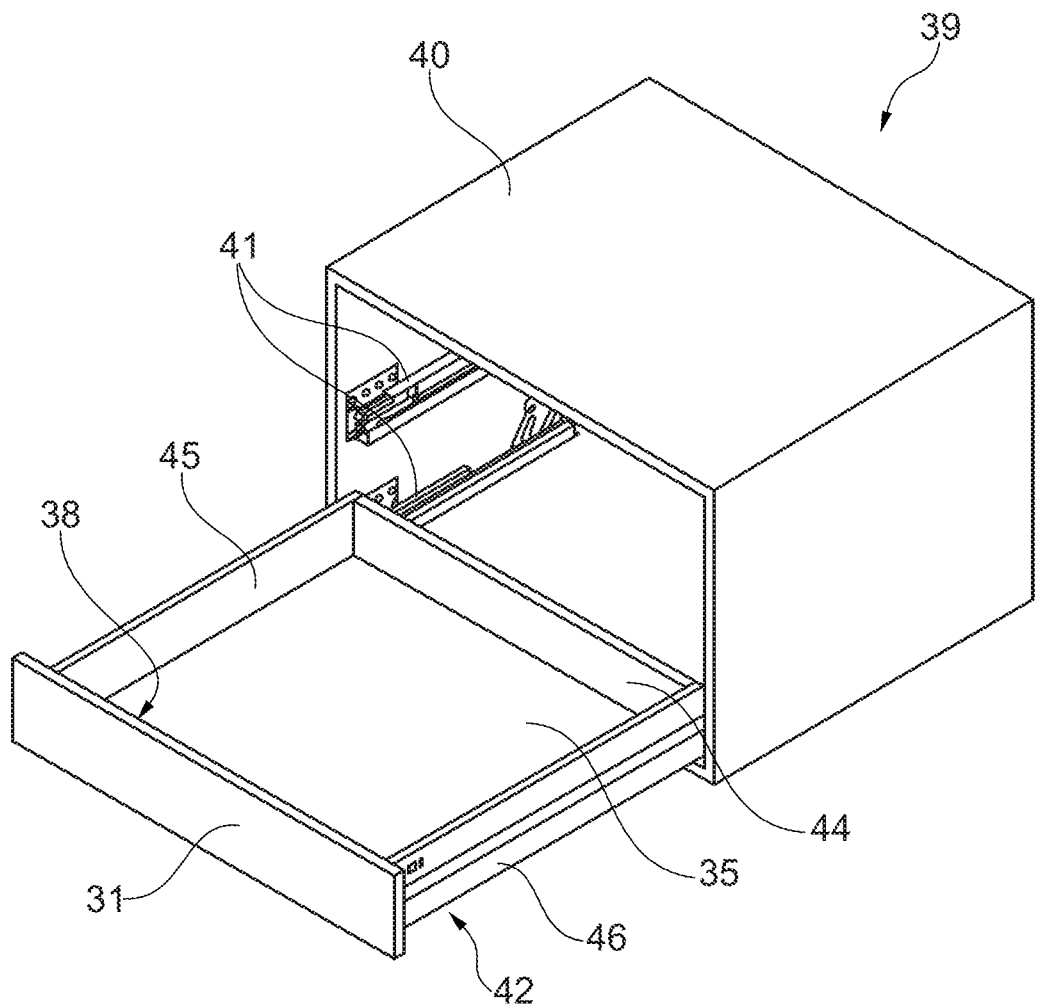
FIG. 20 shows a perspective view from side and front of a furniture item according to the present invention, with a drawer according to the present invention in an opened state.

A furniture item 39 according to the invention comprises, for example, a cabinet body 40, drawer guide rails 41 fitted in the cabinet body 40, and a drawer 42 arranged on the guide rails and comprising the drawer front 31, the drawer base 35, a drawer rear wall 44 and drawer side walls 45, 46. The device 36 (not visible) is arranged on the underside of the drawer base 35 of the drawer 42 (FIG. 20).

REFERENCE SYMBOL LIST 1, 52, eccentric element
2 main body
3 end face
4, 83 assembly element
5, 71 clamping element
6 recess
7, 72 opening
8, 58 connecting element
9, 70 coupling member
10, 80 dowel member
11 pin
12 head
13, 51 housing
14 side wall
15, 76 wall side
16 locking member
17 top wall
18 coupling means
19-21 outer contour
22, 55 supporting portion
23, 56 outer side
24, 57 surface structure
25, 59 opening
26-29 wall portion
30 inner side
31 drawer front
32-33 wall side
34 contact surface
36, 81 device
37 bore
38 inner side
39 furniture item
40 cabinet body
41 guide rail
42 drawer
43 side
44 rear wall
45-46 side wall
47, 64 housing portion
48 assembly opening
49 underside
50 adjustment member
53-54 end
60-63 wall portion
65-66 bearing member
67-68 bearing element
69 clamping means
73 clamping element
74 clamping member
75 housing wall
77 slope
78 stop member
79 region
82 groove structure
84 outer side

The invention claimed is:

1. A device for connecting a first furniture part and a second furniture part, the device comprising:
a housing arrangeable on the first furniture part; and
an eccentric element rotatably mounted in the housing and configured to cooperate with a connecting element,
wherein the housing is flattened on one w-side wall,
wherein the flattened side wall of the housing has a continuous opening,
wherein the flattened side wall of the housing has a structure on an outer surface side thereof,
wherein the structure on the outer surface side of the flattened side wall of the housing comprises a textured structure having a plurality of ribs and grooves extending in both a transverse direction and a longitudinal direction of the flattened side wall of the housing,
wherein the textured structure is configured to correspond to a textured structure of an adjustment member of the connecting element, whereby the textured structure is adapted to enable vertical and/or longitudinal adjustment of the first and second furniture parts relative to one another,
wherein the connecting element is arrangeable on the second furniture part, and the connecting element is adapted to be coupled with the housing and the eccentric element so that the first and the second furniture parts are fixedly connected to each other, and
wherein the continuous opening in the housing on the flattened side wall is fully enclosed at the margin by wall portions.

2. The device according to claim 1, wherein the opening in the housing is configured so that the connecting element, in a movement perpendicular to the flattened sidewall in the direction of the eccentric element, can be slid, projecting through the opening, into the housing.

3. The device according to claim 1, wherein a supporting portion of the flattened side wall of the housing is configured as a region that is deformable in a standard assembly.

4. The device according to claim 1, wherein a clamping element is arranged on an end-face region of the eccentric element, and wherein the eccentric element, with a side lying opposite the clamping element, is firstly inserted into the housing.

5. The device according to claim 4, wherein the eccentric element has a lever configuration, wherein the clamping element is arranged at a first end of the eccentric element, and wherein the eccentric element comprises an assembly element at a second end thereof.

6. The device according to claim 1, wherein when the eccentric element is inserted in the housing, an axis of rotation of the eccentric element is oriented perpendicularly with respect to the flattened side wall.

7. The device according to claim 1, wherein a top wall of the housing is arranged overhanging a side wall of the housing.

8. The device according to claim 7, wherein a coupling means is arranged on a side of the top wall that lies opposite to the side wall.

9. The device according to claim 1, wherein the housing has a locking member.

10. A connecting element for a device according to claim 1, wherein the connecting element has a multi-part configuration and comprises a dowel member and a coupling member.

11. The connecting element for a device according to claim 10, wherein the connecting element comprises the dowel member, the coupling member and an adjustment member.

12. A fitting comprising a device according to claim 1 for connecting two furniture parts.

13. A drawer having a fitting according to claim 12.

14. A furniture item having a drawer according to claim 13.

15. A furniture item having a fitting according to claim 12.

16. A fitting comprising a device according to claim 1 and a connecting element for connecting two furniture parts, wherein the connecting element has a multipart configuration comprising a dowel member and a coupling member.

* * * * *